United States Patent [19]

Evans

[11] Patent Number: 4,691,044
[45] Date of Patent: Sep. 1, 1987

[54] ANTIOXIDANTS FOR ORGANIC MATERIALS

[75] Inventor: Samuel Evans, Marly, Switzerland

[73] Assignee: Ciba-Geigy Corporation, Ardsley, N.Y.

[21] Appl. No.: 770,049

[22] Filed: Aug. 28, 1985

[30] Foreign Application Priority Data

Sep. 3, 1984 [CH] Switzerland .................. 4203/84

[51] Int. Cl.⁴ .............................................. C07C 69/76
[52] U.S. Cl. ...................................... 560/75; 564/185; 564/186
[58] Field of Search ........................... 560/75, 185, 186

[56] References Cited

U.S. PATENT DOCUMENTS 3,992,420 11/1976 Lind et al. ....................... 260/348 R
4,064,158 12/1977 Hay .................................... 260/465

Primary Examiner—Paul J. Killos
Attorney, Agent, or Firm—Luther A. R. Hall

[57] ABSTRACT

Mixtures of substances which are obtainable by reacting elementary sulfur with compounds of the formula I

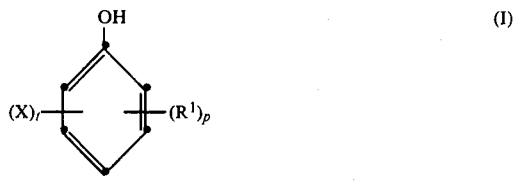

are described. The radical X contains an olefinic double bond. R is a hydrocarbon radical, p is 0, 1 or 2 and t is 1, 2 or 3. The mixtures of substances according to the invention can be employed as antioxidants in organic polymers and in lubricants. They can also be used as high-pressure additives or anti-wear additives.

11 Claims, No Drawings

ANTIOXIDANTS FOR ORGANIC MATERIALS

The present invention relates to novel compositions of sulfur-containing phenols, to a process for their preparation and to the use of these mixtures as stabilisers for organic materials.

Organic compounds, such as plastics or resins and also lubricants, are subject to thermal, oxidative or light-induced degradation. A large number of stabilisers for a plurality of substrates are known in the art. The effectiveness of a stabiliser depends, inter alia, on the nature of the substrate in which it is employed and on the particular mechanism of degradation.

In general, therefore, it is difficult to indicate the most effective and economical stabiliser for an actual application.

Thus, for example, a stabiliser which reduces the volatility of a compound can have the effect of preventing breakage of the bonds in the substrate molecules. In order to ensure a slight embrittlement or the retention of the elasticity of a polymer or elastomer, a stabiliser can be required to prevent excessive crosslinking reactions and/or chain rupture. In order to stop the yellowing of a substrate, it is necessary to prevent the substrate or the stabiliser from undergoing reactions which result in new chromophores. Furthermore, attention must be given to problems of processing stability and compatibility with the substrate.

In addition, in many applications, combinations of properties are desired, for example antioxidative action and anti-wear action.

It has now been found, surprisingly, that mixtures of special sulfur-containing phenols possess an unusual combination of desirable properties.

The compositions according to the invention prove to be particularly useful stabilisers for polyolefines, impact-resistant polystyrene and elastomers in which the retention of elasticity and the prevention of crosslinking reactions, discolouration, odour formation and exudation of the stabiliser are fundamental requirements for the quality of a stabiliser.

Additionally, the compositions according to the invention are liquid and are thus easy to handle from the point of view of industrial hygiene.

These compositions can also be employed as anti-oxidants and EP/AW additives in lubricants and thus possess a combination of properties which is in demand in this field of use.

Sulfur-containing, sterically hindered phenols are described in German Offenlegungsschrift 2,329,494. The compounds contain a thiirane ring and are employed as stabilisers for organic substrates.

The preparation of organomercaptophenols is described in U.S. Patent Specification 4,064,158. In this process, the phenol, elementary sulfur and an activated olefine or an epoxy compound are reacted with one another in the presence of a base and a solvent having a high dielectric constant. The activated olefines employed are compounds carrying at least one electron-attracting group in the immediate vicinity of the double bond.

The present invention relates to mixtures of substances obtainable by reacting elementary sulfur with compounds of the formula I

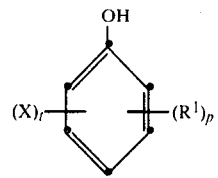

in which $R^1$ is $C_1$–$C_{12}$-alkyl, $C_5$–$C_7$-cycloalkyl, phenyl, 1-naphthyl, 2-naphthyl, $C_7$–$C_9$-aralkyl or $C_7$–$C_9$-alkaryl, t is 1, 2 or 3, p is 0, 1 or 2 and X is one of the groups

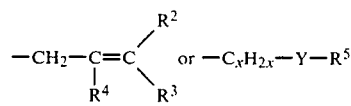

in which $R^2$, $R^3$ and $R^4$ independently of one another are hydrogen or methyl, x is 0, 1, 2 or 3, Y is -CO-O- or -CO-NH- and $R^5$ is a radical

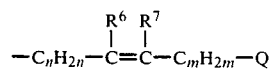

in which n and m independently of one another can assume integral values from 0 to 14, $R^6$ and $R^7$ are hydrogen or $C_1$–$C_8$-alkyl, and Q is hydrogen, methyl or a radical

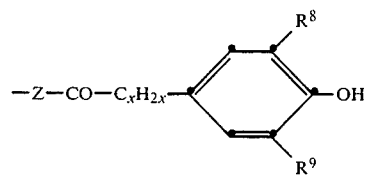

in which Z is —O— or —NH— and $R^8$ and $R^9$ independently of one another are as defined for $R^1$ or are hydrogen. Examples of $R^1$, $R^8$ and $R^9$ as $C_1$–$C_{12}$-alkyl are methyl, ethyl, n-propyl, isopropyl, n-butyl, sec.-butyl, tert.-butyl, n-pentyl, isoamyl, n-hexyl, 1,1-dimethylbutyl, n-heptyl, n-octyl, 2-ethylhexyl, 1,1,3,3-tetramethylbutyl, n-nonyl, n-decyl, n-undecyl, n-dodecyl or 1,1,3,3,5,5-hexamethylhexyl.

$R^1$, $R^8$ and $R^9$ are preferably $C_3$–$C_{12}$-alkyl and then are, for example, isopropyl, sec.-butyl, tert.-butyl, isoamyl, 1,1-dimethylbutyl, 2-ethylhexyl, 1,1,3,3-tetramethylbutyl or 1,1,3,3,5,5-hexamethylhexyl. $R^1$, $R^8$ and $R^9$ are particularly preferentially tert.-butyl.

In a further preferred embodiment, $R^1$ is located, as tert.-butyl, in the o-position relative to the hydroxyl group of the phenyl ring, the index p being either 1 or 2.

Examples of $R^1$, $R^8$ or $R^9$ as $C_5$–$C_7$-cycloalkyl are cyclopentyl, cyclohexyl or cycloheptyl. Cyclohexyl is preferred.

Examples of $R^1$, $R^8$ or $R^9$ as $C_7$–$C_9$-aralkyl are benzyl, α-methylbenzyl or α,α-dimethylbenzyl. Benzyl is particularly preferred.

Examples of $R^1$, $R^8$ or $R^9$ as $C_7$–$C_9$-alkaryl are o-, m- or p-tolyl, 2,3-, 2,4-, 2,5-, 2,6-, 3,4- or 3,5-dimethylphenyl and 2,3,4-, 2,3,5-, 2,3,6-, 2,4,5-, 2,4,6-, 2,5,6- or 3,4,5-trimethylphenyl. o-, m- or p-tolyl is preferred.

$R^2$, $R^3$ and $R^4$ are preferably hydrogen. Y is preferably a group —CO—O—. The indices m and n independently of one another are 1 or 7 or 8. Examples of $R^6$ and $R^7$ as $C_1$-$C_8$-alkyl are methyl, ethyl, n-propyl, isopropyl, n-butyl, sec.-butyl, tert.-butyl, n-pentyl, isoamyl, n-hexyl, n-heptyl or n-octyl.

Linear $C_1$-$C_8$-alkyl radicals are preferred. Methyl is very particularly preferred. $R^6$ and $R^7$ are preferably hydrogen or methyl. However, hydrogen is very particularly preferred.

Q is preferably hydrogen or methyl or a radical

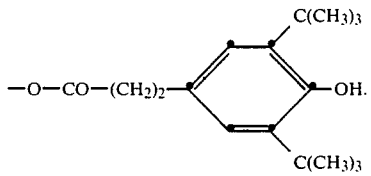

Z is preferable —O—.

Mixtures of substances obtainable by reacting elementary sulfur with compounds of the formula I in which X is a radical

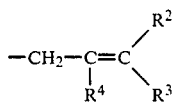

are preferred.

Mixtures of substances obtainable by reacting elementary sulfur with compounds of the formula I in which X is a radical

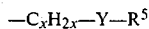

are also preferred.

Mixtures of substances which are very particularly preferred are those which are obtainable by reacting elementary sulfur with compounds of the formula I in which $R^1$ is branched $C_3$-$C_{12}$-alkyl, p is 1 or 2, $R^1$ being located in each case in the o-position relative to the hydroxyl group of the phenyl ring, t is 1 and X is located in the p-position relative to the hydroxyl group of the phenyl ring and is a radical

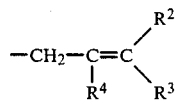

in which $R^2$, $R^3$ and $R^4$ independently of one another are hydrogen or methyl.

Mixtures of substances which are also of interest are those which are obtainable by reacting elementary sulfur with compounds of the formula I in which $R^1$ is tert.-butyl, located in the o-position relative to the hydroxyl group of the phenyl ring, p is 2, t is 1 and X is —$CH_2CH=CH_2$, located in the p-position relative to the hydroxyl group of the phenyl ring.

Mixtures of substances which are also of interest are those which are obtainable by reacting elementary sulfur with compounds of the formula I in which $R^1$ is branched $C_3$-$C_{12}$-alkyl, p is 1 or 2, $R^1$ being located in the o-position relative to the hydroxyl group of the phenyl ring, t is 1 and X is a radical —$C_xH_{2x}$—Y—$R^5$ which is located in the p-position relative to the hydroxyl group of the phenyl ring and in which x is 2 and Y is —CO—O—and $R^5$ is a radical

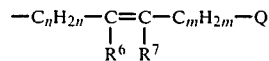

in which n is 8 and m is 7, $R^6$ and $R^7$ independently of one another are hydrogen or methyl and, finally, Q is hydrogen or methyl.

Mixtures of substances which are also preferred are those which are obtainable by reacting elementary sulfur with compounds of the formula I in which $R^1$ is tert.-butyl, located in the o-position relative to the hydroxyl group of the phenyl ring, p is 2, t is 1 and X is a radical —$C_xH_{2x}$—Y—$R^5$ which is located in the p-position relative to the hydroxyl group of the phenyl ring and in which x is 2, Y is —CO—O—and $R^5$ is a radical

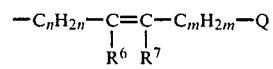

in which m is 8 and n is 7, $R^6$ and $R^7$ are hydrogen and, finally, Q is methyl, or in which m is O, n is the number 1 and $R^6$, $R^7$ and Q are hydrogen.

Mixtures of substances which are very particularly preferred are those which are obtainable by reacting elementary sulfur with compounds of the formula I in which $R^1$ is tert.-butyl, located in the o-position relative to the phenolic hydroxyl group, p is 2, t is 1 and X is a radical —$C_xH_{2x}$—Y—$R^5$ which is located in the p-position relative to the phenolic hydroxyl group and in which x is 2, Y is —CO—O—, $R^6$ and $R^7$ are hydrogen and Q is a radical

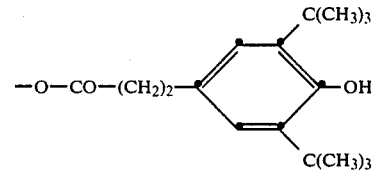

The following representatives of compounds of the formula I can, for example, be employed as starting materials for the preparation of the mixtures of substances according to the invention: 2-allylphenol, 4-allylphenol, 2-methyl-4-allylphenol, 2-ethyl-4-allylphenol, 2-isopropyl-4-allylphenol, 2-n-butyl-4-allyl2-tert.-butyl-4-allylphenol, 2-(2-ethylhexyl)-4allylphenol, 2-n-dodecyl-4-allylphenol, 2-cyclohexyl-4-allylphenol, 2-phenyl-4-allylphenol, 2-benzyl-4-allylphenol, 2-p-tolyl-4-allylphenol, 2,5-dimethyl-4-allylphenol, 2,5-di-tert.-butyl-4-allylphenol, 2,5-di-(2-ethylhexyl)-4-allylphenol, 2,5-di-n-dodecyl-4-allylphenol, 2,5-di-cyclohexyl-4-allylphenol, 2,5-di-phenyl-4-allylphenol, 2,5-dibenzyl-4-allylphenol, 2,5-di-p-tolyl-4-allylphenol, 2,5-di-tert.-butyl-4-(2-methylallyl)-phenol, 2,5-di-tert.-butyl-4-(but-2-enyl)-phenol, 2,5-di-tert.-butyl-4-(3-methylbut-2-enyl)-phenol 2,5-di-tert.-butyl-4-(2,3-dimethylbut-2-enyl)-phenol, 1,4-di(3,5-di-tert.-butyl-4-hydroxyphenyl)-but-2-ene, but-2-enyl 4-hydroxy-3,5-di-tert.-butylbenzoate, the N-but-2-enylamide of 4-hydroxy-3,5-di-tert.-butylbenzoic acid, 1,4-but-2-enediyl bis-(4-hydroxy-3,5-di-tert.-butylbenzoate), the diamide of 1,4-diaminobut-2-ene and 4-hydroxy-3,5-di-tert.- butylbenzoic acid and but-2-enyl 4-hydroxy-3,5-ditert.-butyl-benzyl-carboxylate.

The reaction of the compound of the formula I with elementary sulfur is effected in the presence or the absence of a solvent and, if appropriate, in the presence of a base. 5 to 1000 parts of sulfur are employed for 100 parts of compound of the formula I. 10 to 300 parts by weight of sulfur are preferred. The solvents used can be aromatic or aliphatic hydrocarbons, for example benzene, toluene, xylenes, n-hexane or ligroin. The reaction can, however, also be carried out in nitrated or chlorinated hydrocarbons. Examples of these are chlorobenzene or nitrobenzene. It is also possible to use aprotic solvents, for example dimethylformamide.

If a base is used in the reaction with sulfur, this base is added in an amount of 0.1–20 mol % (relative to the reaction mixture).

This base is, for example, an alkali or alkaline earth metal hydroxide, an alkali metal alcoholate or phenate or an amine. Examples of these are sodium hydroxide, potassium hydroxide, lithium hydroxide, magnesium hydroxide or calcium hydroxide, and also sodium methylate, ethylate or phenate, or monoethylamine, diethylamine, triethylamine or aniline.

Depending on the reaction, the reaction temperature is between 50° C. and 200° C., preferably between 120° C. and 190° C.

The invention also relates, therefore, to a process for the preparation of mixtures of substances, which comprises reacting 100 parts of compounds of the formula I or mixtures of these compounds with 5 to 1000 parts by weight of elementary sulfur in the presence or absence of an organic solvent and, if appropriate, a base, the reaction temperature being between 50° C. and 200° C.

In a preferred embodiment of the process, compounds of the formula

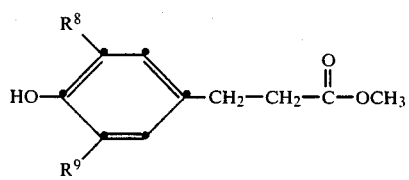

are used as the starting materials.

These compounds are available commercially or can be prepared readily by means of standard reactions with which those skilled in the art are familiar.

The compounds of the formula II are reacted with an unsaturated alcohol R'-OH in the presence of a base. Compounds of the formula I are obtained as a transesterification product. Examples of bases which can be used are potassium hydroxide, sodium hydroxide, lithium amide or lithium hydride. The transesterification is carried out in the presence or absence of a solvent.

The following are examples of solvents which can be used: toluene, xylene, chlorobenzene or ligroin. Depending on the reaction, the reaction temperature is between 80° C. and 180° C. The starting material thus obtained is then reacted further, in the manner described above, together with sulfur.

The end product is a complicated mixture of various substances. Addition of the sulfur to the double bond probably takes place. Bound sulfur can be detected with the aid of NMR spectroscopy.

A particularly preferred end product is formed by reacting the compound of the formula III

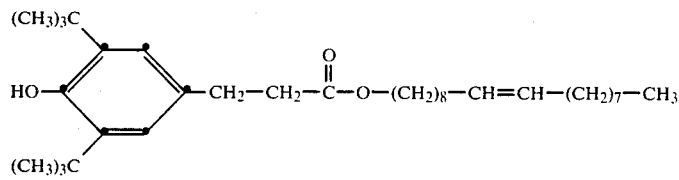

with sulfur. The end product contains 14.4% of chemically bound sulfur. The starting material is preferably prepared by transesterifying a compound of the formula II with an octadec-9-enol by the process described above.

The present invention also relates to compositions containing an organic material which is sensitive to thermal, oxidative or radiation-induced degradation and, as a stabiliser, the mixture of substances characterised by the reaction described above.

Compositions in which the organic material is a polymer, in particular an elastomer, are preferred. The following elastomers are particularly preferred: polydienes, for example polybutadiene, polyisoprene or polychloroprene; block polymers, for example styrene/butadiene/styrene, styrene/isoprene/styrene or styrene/ethylene/propylene/styrene types; and acrylonitrile polymers.

These polymers can also be in the form of latices and can be stabilised in this form.

Compositions in which the organic material is a synthetic lubricant or a lubricant based on mineral oil are also preferred.

The lubricants which are suitable are familiar to those skilled in the art and are described, for example, in "Schmiermittel Taschenbuch ("Manual of lubricants")" (Hüthig Verlag, Heidelberg, 1974)".

The invention also relates to the use of the mixtures described above as stabilisers for organic materials against damage caused to the latter by the action of oxygen, heat, light and high-energy radiation.

The preferred use of the mixtures is as antioxidants in organic polymers, particularly in elastomers, or their use in mineral oils or synthetic oils.

The mixtures of substances according to the invention are also particularly suitable as EP/AW additives for lubricants or as additives for metal-working liquids.

The following are further examples of organic materials which can be stabilised advantageously by means of the mixtures of substances according to the invention:

1. Polymers of monoolefines and diolefines, for example polyethylene (which can, if appropriate, be crosslinked), polypropylene, polyisobutylene, polybut-1-ene, polymethylpent-1-ene, polyisoprene or polybutadiene, and also polymers of cycloolefines, for example cyclopentene or norbornene.

2. Mixtures of the polymers mentioned under 1), for example mixtures of polypropylene and polyisobutylene.

3. Copolymers of monoolefines and diolefines with one another or with other vinyl monomers, for example ethylene/propylene copolymers, propylene/but-1-ene copolymers, propylene/isobutylene copolymers, ethylene/but-1-ene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and salts thereof (ionomers), and also terpolymers of ethylene with propylene and a diene, such as hexadiene, dicyclopentadiene or ethylidenenorbornene.

4. Polystyrene or poly-(p-methylstyrene).

5. Copolymers of styrene orα-methylstyrene with dienes or acrylic derivatives, for example styrene/butadiene, styrene/acrylonitrile, styrene/alkyl methacrylate, styrene/ maleic anhydride or styrene/acrylonitrile/methyl acrylate; mixtures of high impact strength obtained from styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylenebutylene/styrene or styrene/ethylenepropylene/styrene.

6. Graft copolymers of styrene, for example styrene on polybutadiene, styrene and acrylonitrile on polybutadiene, styrene and maleic anhydride on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers and mixtures thereof with the copolymers mentioned under 5), such as are known, for example, as so-called ABS, MBS, ASA or AES polymers.

7. Halogen-containing polymers, for example polychloroprene, chlorinated rubber, chlorinated or chlorosulfonated polyethylene, epichlorohydrin homopolymers and copolymers, in particular polymers formed from halogen-containing vinyl compounds, for example polyvinyl chloride, polyvinylidene chloride, polyvinyl fluoride or polyvinylidene fluoride; and also copolymers thereof, such as vinyl chloride/vinylidene chloride, vinyl chloride/vinyl acetate or vinylidene chloride/vinyl acetate.

8. Polymers derived from α, β-unsaturated acids and derivatives thereof, such as polyacrylates and polymethacrylates, polyacrylamides and polyacrylonitriles.

9. Copolymers of the monomers mentioned under 8) with one another or with other unsaturated monomers, for example acrylonitrile/butadiene copolymers, acrylonitrile/acrylate copolymers, acrylonitrile/alkoxyalkyl acrylate copolymers, acrylonitrile/vinyl halide copolymers or acrylonitrile/alkyl methacrylate/butadiene terpolymers.

10. Polymers derived from unsaturated alcohols and amines or acyl derivatives or acetals thereof, such as polyvinyl alcohol, polyvinyl acetate, stearate, benzoate or maleate, polyvinyl butyral, polyallyl phthalate or polyallylmelamine.

11. Homopolymers and copolymers of cyclic ethers, such as polyalkylene glycols, polyethylene oxide, polypropylene oxide or copolymers thereof with bisglycidyl ethers.

12. Polyacetals, such as polyoxymethylene, and also polyoxymethylene containing comonomers, for example ethylene oxide.

13. Polyphenyl oxides and sulfides and mixtures thereof with styrene polymers.

14. Polyurethanes derived on the one hand from polyethers, polyesters and polybutadienes containing terminal hydroxyl groups and, on the other hand, from aliphatic or aromatic polyisocyanates, and also precursors thereof.

15. Polyamides and copolyamides derived from diamines and dicarboxylic acids and/or aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide and poly-m-phenyleneisophthalamide, and also block copolymers thereof with polyethers, for example polyethylene glycol, polypropylene glycol or polytetramethylene glycol.

16. Polyureas, polyimides, polyamide-imides and polybenzimidazoles.

17. Polyesters derived from dicarboxylic acids and dialcohols and/or hydroxycarboxylic acids or the corresponding lactones, such as polyethylene terephthalate, polybutylene terephthalate, poly-1,4-dimethylolcyclohexane terephthalate and polyhydroxybenzoate, and also block polyether-esters derived from polyethers containing hydroxyl end groups.

18. Polycarbonates and polyester-carbonates

19. Polysulfones, polyether-sulfones and polyetherketones.

20. Crosslinked polymers derived on the one hand from aldehydes and on the other hand from phenols, urea or melamine, such as phenol-formaldehyde, urea-formaldehyde and melamineformaldehyde resins.

21. Drying and non-drying alkyd resins.

22. Unsaturated polyester resins derived from copolymers of saturated and unsaturated dicarboxylic acids with polyhydric alcohols, and also vinyl compounds as crosslinking agents, and also halogen-containing modifications thereof of low combustibility.

23. Crosslinkable acrylic resins derived from substituted acrylic acid esters, for example epoxyacrylates, urethaneacrylates or polyester-acrylates.

24. Alkyd resins, polyester resins and acrylic resins which have been crosslinked with melamine resins, urea resins, polyisocyanates or epoxide resins.

25. Crosslinked epoxide resins derived from polyepoxides, for example bisglycidylethers or cycloaliphatic diepoxides.

26. Natural polymers, such as cellulose, natural rubber, gelatine and polymer-homologously chemically modified derivatives thereof, such as cellulose acetates, propionates and butyrates, and the cellulose ethers, such as methylcellulose.

27. Mixtures (polyblends) of the abovementioned polymers, for example PP/EPDM, polyamide 6/EPDM or ABS, PVC/EVA, PVC/ ABS, PVC/MBS, PC/ABS and PBTP/ABS.

28. Natural and synthetic organic substances which are pure monomeric compounds or mixtures of the latter, for example mineral oils, animal or vegetable fats, oils and waxes or oils, waxes and fats based on synthetic esters (for example phthalates, adipates, phosphates or trimellitates), and also mixtures of synthetic esters with mineral oils in any desired ratios by weight, such as are used, for example, as spinning dressings, and also aqueous emulsions thereof.

29. Aqueous emulsions of natural or synthetic rubbers, for example natural rubber latex or latices of carboxylated styrene/butadiene copolymers.

The stabiliser mixtures are added to the plastics or lubricants in a concentration of 0.01–10% by weight, calculated on the material to be stabilised. Preferably, 0.05 to 5.0% by weight, particularly preferentially 0.1 to 2.0% by weight, of the mixtures, calculated on the material to be stabilised, are incorporated into the latter.

The incorporation can be effected, for example, by mixing in the stabiliser mixtures and, if appropriate, further additives by the methods customary in the art, before or during shaping, or by applying the dissolved or dispersed compounds to the polymer, if appropriate with subsequent evaporation of the solvent. The new stabiliser mixtures can also be added to the plastics to be stabilised in the form of a master batch containing these mixtures, for example, in a concentration of 2.5 to 25% by weight.

In the case of crosslinked polyethylene, the stabilisers are added before crosslinking.

The materials thus stabilised can be used in a very wide variety of forms, for example as sheeting, fibres, tapes, moulding compositions or profiles, or as binders for lacquers, adhesives or putties.

In practice, the stabiliser mixtures according to the invention can be employed together with other stabilisers.

Lubricant formulations can also contain, in addition, other additives which are added in order to improve certain properties, in use, for example further amine antioxidants, metal passivators, rust inhibitors, viscosity index improvers, pour-point depressants, dispersing agents/surfactants and anti-wear additives.

The following may be mentioned as examples of further additives with which the stabiliser mixtures used in accordance with the invention can be employed conjointly:

1. Antioxidants

1.1. Alkylated monophenols 2,6-Di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-i-butyl-phenol, 2,6-di-cyclopentyl-4-methylphenol, 2-(-methylcyclohexyl)-4,6-dimethylphenol, 2,6-di-octadecyl-4-methylphenol, 2,4,6-tri-cyclohexylphenol, 2,6-di-tert.-butyl-4-methoxymethylphenol.

1.2. Alkylated hydroquinones 2,6-Di-tert.-butyl-4-methoxyphenol, 2,5-di-tert.butyl-hydroquinone, 2,5-di-tert.-amylhydroquinone and 2,6-diphenyl-4-octadecyloxyphenol.

1.3. Hydroxylated thiodiphenyl ethers 2,2'-Thiobis-(6-tert.-butyl-4-methylphenol), 2,2'-thiobis-(4-octylphenol), 4,4'-thiobis-(6-tert.-butyl-3-methylphenol) and 4,4'-thiobis-(6-tert.-butyl-2-methylphenol)

1.4. Alkylidene-bisphenols 2,2'-Methylenebis-(6-tert.-butyl-4-methylphenol), 2,2'-methylenebis-(6-tert.-butyl-4-ethylphenol), 2,2'-methylenebis-[4-methyl-6-(α-methylcyclohexyl)-phenol], 2,2'-methylenebis-(4-methyl-6-cyclohexylphenol), 2,2'-methylenebis-(6-nonyl-4-methylphenol), 2,2'-methylenebis-(4,6-di-tert.butylphenol), 2,2'-ethylidenebis-(4,6-di-tert.-butylphenol), 2,2'-ethylidenebis-(6-tert.-4-isobutylphenol), 2,2'-methylenebis-[6-(α-methyl-benzyl)-4-nonylphenol], 2,2'-methylenebis-[6-α, α-dimethylbenzyl)-4-nonylphenol], 4,4'-methylenebis-(2,6-di-tert.-butylphenol), 4,4'-methylenebis-(6-tert.-butyl-2-methylphenol), 1,1-bis-(5-tert.-butyl-4-hydroxy-2-methylphenyl)-butane, 2,6-di-(3-tert.-butyl-5-methyl-2-hydroxybenzyl)-4-methylphenol, 1,1,3-tris-(5-tert.-butyl-4-hydroxy2-methylphenyl)-butane, 1,1-bis-(5-tert.-butyl-4-hydroxy-2-methylphenyl)-3 -n-dodecylmercaptobutane, ethylene glycol bis-[3,3-bis-(3'-tert.-butyl-4'-hydroxyphenyl)-butyrate], di-(3-tert.-butyl-4-hydroxy-5-methylphenyl)-dicyclopentadiene and di-[2-(3'-tert.-butyl-2'-hydroxy-5'-methylbenzyl)-6-tert.-butyl-4-methylphenyl]terephthalate.

1.5. Benzyl compounds 1,3,5-Tri-(3,5-di-tert.-butyl-4-hydroxybenzyl)-2,4,6-trimethylbenzene, di-(3,5-di-tert.-butyl-4-hydroxybenzyl) sulfide, isooctyl 3,5-di-tert.-butyl-4-hydroxybenzyl-mercaptoacetate, bis-(4-tert.-butyl-3-hydroxy-2,6-dimethylbenzyl)-dithiol terephthalate, 1,3,5-tris-(3,5-di-tert.-butyl-4-hydroxybenzyl) isocyanurate, 1,3,5-tris-(4-tert.-butyl-3-hydroxy-2,6-dimethylbenzyl) isocyanurate, di-octadecyl 3,5-di-tert.-butyl-4-hydroxybenzylphosphonate and the calcium salt of monoethyl 3,5-di-tert.-butyl-4-hydroxybenzylphosphonate.

1.6. Acylaminophenols

4-Hydroxylauranilide, 4-hydroxystearanilide, 2,4-bisoctylmercapto-6-(3,5-di-tert.-butyl-4-hydroxyanilino)-s-triazine and octyl N-(3,5-di-tert.-butyl-4-hydroxyphenyl)-carbamate.

1.7. Esters of β-(3,5-di-tert.-butyl-4-hydroxyphenyl)-propionic acid with monohydric or polyhydric alcohols, for example:

| | |
|---|---|
| Methanol | Diethylene glycol |
| Octadecanol | Triethylene glycol |
| 1,6-Hexanediol | Pentaerythritol |
| Neopentylglycol | Trishydroxyethyl isocyanurate |
| Thiodiethylene glycol | Dihydroxyethyloxamide |

1.8. Esters of β-(5-tert.-butyl-4-hydroxy-3-methylphenyl)-propionic acid with monohydric or polyhydric alcohols, for example

| | |
|---|---|
| Methanol | Diethylene glycol |
| Octadecanol | Triethylene glycol |
| 1,6-Hexanediol | Pentaerythritol |
| Neopentylglycol | Trishydroxyethyl isocyanurate |
| Thiodiethylene glycol | Dihydroxyethyloxamide |

1.9. Amides of β-(3,5-di-tert.-butyl-4-hydroxyphenyl)-propionic acid, for example:

N,N'-Di-(3,5-di-tert.-butyl-4-hydroxyphenylpropionyl)hexamethylenediamine, N,N'-di-(3,5-di-tert.-butyl-4-hydroxyphenylpropionyl)-trimethylenediamine and N,N'-di-(3,5-di-tert.-butyl-4-hydroxyphenylpropionyl)-hydrazine.

1.10. Amine antioxidants

N,N'-Di-isopropyl-p-phenylenediamine, N,N'-di-sec.-butyl-p-phenylenediamine, N,N'-bis(1,4-dimethylpentyl)-p-phenylenediamine, N,N'-bis(1-ethyl-3-methylpentyl)-p-phenphenylenediamine, lenediamine, N,N'-bis(1-methylheptyl)-p-phenylenediamine, N,N'-dicyclohexyl-p-phenylenediamine, N,N'-diphenyl-p- phenylenediamine, N,N'-di-(naphth-2-yl)-p-phenylenediamine, N-isopropyl -N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'di-sec.-butyl-p-phenylenediamine, diphenylamine, 4-isopropoxydiphenylamine, N-phenyl-1-naphthylamine, N-phenyl-2-naphthylamine, otcylated diphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)-amine, 2,6-di-tert.-butyl-4-dimethylaminomethylphenol, 2,4'-diaminodiphenylmethane, 4,4'-diaminodiphenylmethane, N,N,N,N'-tetramethyl-4,4'-diaminodiphenylmethane, 1,2-di-(phenylamino)ethane, 1,2-di-[(2-methylphenyl)-amino]-ethane, 1,3-di(phenylamino)-propane, (o-tolyl)-biguanide and di-[4-(1', 3'-dimethylbutyl)-phenyl]amine.

2. UV absorbers and light stabilisers 2.1. 2-(2'-Hydroxyphenyl)-benztriazoles, for example the 5'-methyl-, 3',5'-di-tert.-butyl-, 5'-tert.-butyl-, 5'-(1,1,3,3-tetramethylbutyl)-, 5-chloro-3', 5'-di-tert.-butyl-, 5-chloro-3'-tert.-butyl-5'-methyl-, 3'-sec.-butyl-5'-tert-.butyl, 4'-octoxy-, 3', 5'-di-tert.-amyl- and 3', 5'-bis-($\alpha$, $\alpha$-dimethylbenzyl)-derivative.

2.2. 2-Hydroxybenzophenones, for example the 4-hydroxy-, 4-methoxy-, 4-octoxy-, 4-decyloxy-, 4-dodecyloxy-, 4-benzyloxy, 4,2', 4'-trihydroxy- and 2'-hydroxy-4,4'-dimethoxy-derivative.

2.3. Esters of substituted or unsubstituted benzoic acids, for example 4-tert.-butylphenyl salicylate, phenyl salicylate, octylphenyl salicylate, dibenzoylresorcinol, bis-(4-tert.-butylbenzoyl)-resorcinol, benzoylresorcinol, 2,4-di-tert.-butylphenyl 3,5-di-tert.-butyl-4-hydroxybenzoate and hexadecyl 3,5-di-tert.-butyl-4-hydroxybenzoate.

2.4. Acrylates, for example ethyl or isooctyl $\alpha$-cyano-$\beta$, $\beta$-diphenylacrylate, methyl $\alpha$-carbomethoxycinnamate, methyl or butyl$\alpha$-cyano-$\beta$-methyl-p-methoxycinnamate, methyl$\alpha$-carbomethoxy -p-methoxycinnamate and N-($\beta$-carbomethoxy-$\beta$-cyanovinyl)-2-methylindoline.

2.5. Nickel compounds, for example nickel complexes of 2,2'-thiobis -[4-(1,1,3,3-tetramethylbutyl)-phenol], such as the 1:1 or 1:2 complex, if appropriate with additional ligands such as n-butylamine, triethanolamine or N-cyclohexyldiethanolamine, nickel dibutyldithiocarbamate, nickel salts of monoalkyl esters of 4-hydroxy-3,5-di-tert.-butylbenzylphosphonic acid, such as the methyl or ethyl ester, nickel complexes of ketoximes, such as 2-hydroxy-4-methylphenyl undecyl ketone oxime, and nickel complexes of 1-phenyl-4-Lauroyl-5-hydroxypyrazole, if appropriate with additional ligands.

2.6. Sterically hindered amines. for example bis-(2,2,6,6-tetramethylpiperidyl) sebacate, bis-(1,2,2,6,6-pentamethylpiperidyl) sebacate, bis-(1,2,2,6,6-pentamethylpiperidyl) n-butyl-3,5-di-tert.-butyl-4-hydroxybenzylmalonate, the condensation product formed from 1-hydroxyethyl-2,2,6,6-tetramethyl-4-hydroxypiperidine and succinic acid, condensation product formed from N,N'-(2,2,6,6-tetramethyl-4-piperidyl)hexamethylenediamine and 4-tert.-octylamino-2,6-dichloro-1,3,5-s-triazine, tris-(2,2,6,6-tetramethyl-4-piperidyl) nitrilotriacetate, tetrakis-(2,2,6,6-tetramethyl-4-piperidyl) 1,2,3,4-butanetetracarboxylate and 1,1'-(1,2-ethanediyl)-bis-(3,3,5,5-tetramethylpiperazinone).

2.7. Oxamides, for example 4,4'-di-octyloxyoxanilide, 2,2'-di-octyloxy-5,5'-di-tert.-butyloxanilide, 2,2'-di-dodecyloxy-5,5'-di-tert.-butyloxanilide, 2-ethoxy-2'-ethyloxanilide, N,N'-bis-(3-dimethylaminopropyl)-oxamide, 2-ethoxy-5-tert.-butyl-2'-ethyloxanilide and a mixture thereof with 2-ethoxy-2'-ethyl-5,4'-di-tert.-butyloxanilide and mixtures of ortho-and para-methoxy-substituted oxanilides and of o-ethoxy- and p-ethoxy-disubstituted oxanilides.

3. Metal deactivators, for example N,N'-diphenyloxamide, N-salicylal-N'-salicyloylhydrazine, N,N'-bis-salicyloylhydrazine, N,N'-bis-(3,5-di-tert.-butyl-4-hydroxyphenylpropionyl)-hydrazine, 3-salicyloylamino-1,2,4-triazole and bis-benzylideneoxalic acid hydrazide.

4. Phosphites and phosphonites, for example, triphenyl phosphite, diphenyl alkyl phosphites, phenyldialkyl phosphites, tri-(nonylphenyl) phosphite, trilauryl phosphite, trioctadecyl phosphite, distearylpentaerythrityl diphosphite, tris-(2,4-di-tert.-butylphenyl) phosphite, diisodecylpentaerythrityl diphosphite, di-(2,4-di-tert.-butylphenyl)-pentaerythrityl diphosphite, tris-tearylsorbityl triphosphite and tetrakis-(2,4-di-tert.-butylphenyl) 4,4'-biphenylenediphosphonite.

5. Compounds which destroy peroxides, for example esters of $\beta$-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide and pentaerythrityl tetrakis-($\beta$-dodecylmercapto)-propionate.

6. Polyamide stabilisers, for example copper salts in combination with iodides and/or phosphorus compounds and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes and alkali and alkaline earth metal salts of higher fatty acids, for example Ca stearate, Zn stearate, Mg stearate, Na ricinoleate, K palmitate, antimony pyrocatecholate or tin pyrocatecholate.

8. Nucleating agents, for example 4-tert.-butylbenzoic acid, adipic acid and diphenylacetic acid.

9. Fillers and reinforcing agents, for example calcium carbonate, silicates, glass fibres, asbestos, talc, kaolin, mica, barium sulfate, metal oxides and hydroxides, carbon black and graphite.

10. Other additives. for example plasticisers, lubricants, emulsifiers, pigments, fluorescent brighteners, flameproofing agents, antistatic agents and blowing agents.

11. Metal passivators: for copper, for example: benztriazole, tetrahydrobenztriazole, 2-mercaptobenztiazole, 2,5-dimercaptothiadiazole, salicylidenepropylenediamine and salts of salicylaminoguanidine.

12. Rust inhibitors:

(a) Organic esters and esters, metal salts and anhydrides thereof, for example: N-oleoylsarcosine, sorbitan monooleate, lead naphthenate, dodecenylsuccinic anhydride, alkenylsuccinic acid half-esters and 4-nonylphenoxyacetic acid.

(b) Nitrogen-containing compounds, for example:

I. Primary, secondary or tertiary aliphatic or cycloaliphatic amines and amine salts of organic and inorganic acids, for example oil-soluble alkylammonium carboxylates.

II. Heterocyclic compounds, for example: substituted imidazolines and oxazolines.

(c) Phosphorus-containing compounds, for example: amine salts of phosphoric acid partial esters.

(d) Sulfur-containing compounds, for example: barium dinonylnaphthalenesulfonate and calcium petroleum sulfonates.

13. Viscosity index improvers:

Polymethacrylates, vinylpyrrolidone/methacrylate copolymers, polybutenes, olefine copolymers and styrene/acrylate copolymers.

14. Pour-point depressants:

Polymethacrylate and alkylated naphthalene derivatives.

15. Dispersing agents/surfactants:

Polybutenylsuccinic acid imides, polybutenylphosphonic acid derivatives and basic magnesium, calcium and barium sulfonates and phenates.

16. Anti-wear additives:

Compounds containing sulfur and/or phosphorus and/or halogen, such as sulfurised vegetable oils, zinc dialkyldithiophosphates, tritolyl phosphate, chlorinated paraffins and alkyl and aryl disulfides.

In the following examples, all percentages are percentages by weight.

PREPARATION EXAMPLES

Example 1

(a) Preparation of oleyl β-(3,5-di-tert.-butyl-4-hydroxyphenyl)-propionate 292.4 g (1 mole) of methyl β-(3,5-di-tert.-butyl-4-hydroxyphenyl)-propionate and 383.6 g (1 mole) of oleyl alcohol are initially taken in 50 ml of toluene and are heated at 120° C., so that the toluene has distilled off in the course of one hour. 2.5 g of lithium amide are then added and the methanol which is formed is distilled off at 80° C. The mixture is then heated to 120° C. and is kept at this temperature for 4 hours. The reaction is monitored by thin layer chromatography. When the reaction is complete, the reaction mixture is dissolved in 200 ml of toluene, neutralised with 12 ml of concentrated HCl and then washed with twice 200 ml of water.

The organic phase is separated off, dried over Na$_2$SO$_4$ and concentrated on a rotary evaporator. The residue is dried at 80° C. in a high vacuum. This gives a slightly yellowish oil (yield: 95% of theory)

| Analysis: | C | H |
|---|---|---|
| calculated | 79.49 | 11.44 |
| found | 79.3 | 11.7 |

(b) Reaction of the oleyl ester with sulfur 100 g of the product prepared in 1a) are mixed with 5 g of sulfur and heated to 180° C. This temperature is maintained for one hour. 5 g of sulfur are then added every further hour, until the total amount of sulfur is 30 g. The reaction mixture is then left at 180° C. for a further 6 hours to complete the reaction. The residue is then taken up in 150 ml of hexane, the extract is filtered through 10 g of Tonsil ®AC, and the filtrate is concentrated on a rotary evaporator. The residue is dried for 2 hours at 80° C. in a high vacuum. This gives 110 g of a black oil containing 14.4% by weight of bound sulfur.

The $^1$H-NMR spectrum shows no further —CH═CH—resonances. A fragment M$^+$=592 (=molecular weight of the starting material +2S) is to be found in the mass spectrum.

Example 2

30.88 g (0.1 mole) of 4-allyl-2,6-di-tert.-butylphenol and 1.6 g (0.05 mole) of sulfur are put, under a gentle stream of nitrogen, into a 100 ml sulfonation flask equipped with a thermometer and a reflux condenser. The mixture is heated to 140° C. and is kept at this temperature for 24 hours. After this time a thin layer chromatogram (mobile phase hexane) indicates that sulfur is no longer present. The reaction product is dissolved in 50 ml of toluene. This gives a dark, clear solution. This solution is washed twice with 50 ml of water, dried over 10 g of Na$_2$SO$_4$, filtered and concentrated in a rotary evaporator, and the residue is then dried for 2 hours at 80° C. in a high vacuum.

This gives 28.5 g of a dark, highly viscous oil (molecular weight: ~400; sulfur content: 5.2%).

Examples 3–6

The procedure followed is exactly the same as in Example 2, but using varying amounts of sulfur.

The sulfur content of the end products can be seen from Table 1 below.

TABLE 1

| Example No. | S$_2$ content (%) | Appearance | Softening point |
|---|---|---|---|
| Example 3 | 11.0 | dark resin | ~30° C. |
| Example 4 | 14.1 | dark resin | ~30° C. |
| Example 5 | 2.7 | dark viscous oil | — |
| Example 6 | 7.9 | dark resin | ~30° C. |

Example 7

31.8 g of 2,5-di-tert.-butyl-4-[2-(allyloxycarbonyl)et-yl]-phenol and 1.7 g of sulfur (5%) are put into 10 ml of dimethylformamide. The mixture is heated at 100° C. for 18 hours and at 140° C. for a further 5 hours. After this time a thin layer chromatogram (mobile phase hexane: toluene in a ratio of 75:25) indicates that sulfur is no longer present. The reaction product is poured into 100 ml of toluene. This solution is worked up as described in Example 2. 30.7 g of a black, viscous oil having a sulfur content of 4.8% are obtained.

Example 8

The procedure of Example 7 is repeated, except that 10% of sulfur are used.

34.8 g of a black, viscous oil having a sulfur content of 9.4% are obtained.

USE EXAMPLES

Example 9

Oil oxidation test, standard version as specified in ASTM 2272 (rotary bomb oxidation test)

The mixture prepared in Example 1 is tested in mineral oil I*) [viscosity 14.8 mm$^2$/seconds (100° C.)]as specified in ASTM 2272. The test is complete when the pressure has fallen by 1.7 bar. The results indicated in Table 2 below indicate the time (in minutes) after which the pressure drop indicated has taken place. Long times correspond to good effectiveness as a stabiliser. Stabiliser concentration: 0.5%, relative to the oil.

The breakdown of the total carbon content of the oil is 6.5% aromatic carbon, 72% paraffinic carbon and 21.5% naphthenic carbon. The oil contains 0.54% of sulfur.

TABLE 2

| Stabiliser | Minutes required for pressure to fall by 1.7 bar |
|---|---|
| none | 25 |
| Mixture according to Example 1 | 207 |

*The breakdown of the total carbon content of the oil is 6.5% aromatic carbon, 72% paraffinic carbon and 21.5% naphthenic carbon. The oil contains 0.54% of sulfur.

Example 10

TOST test, oxidation characteristics of Mobil 27 oil (ASTM D 943/DIN 51587/IP 157)

The oil to be tested contains 0.05% of Reocor ® 12 (an iron corrosion inhibitor) and is heated at 95° C. for 500 hours in the presence of water, oxygen, an iron-copper catalyst and a stabiliser mixture according to the invention. After this, the acid value (in mg of KOH consumer per g of test oil) and the sludge (in mg of residue per batch) are determined. The results are collated in Table 3.

In each case, the concentration of stabiliser mixture is 0.25%, relative to the oil.

TABLE 3

| Stabiliser | 500 hours | |
|---|---|---|
| | Acid value (mg of KOH/g) | Sludge (mg) |
| none | ≧2.0 | ≧5000 |
| Example 1 | 0.18 | 52.0 |
| Example 2 | 0.14 | 36 |
| Example 3 | 0.12 | 51 |
| Example 4 | 0.06 | 48 |

Example 11

TFOUT test (Thin-Film Oxygen Uptake Test)

This test is a modified version of the "Rotary Bomb Oxidation test for mineral oils" (ASTM D 2272). It is described in detail in "C. S. Ku and S. M. Hsu, A Thin-Film Oxygen Uptake Test for the Evaluation of Automotive Crankcase Lubricants, *Lubrication Engineering*, volume 40 (2), 75–83 (1984)". The test oil used is an engine oil based on mineral oil and containing half the customary amount of zinc dithiophosphate (0.75%; zinc content: 0.06%, relative to the engine oil).

The compound prepared is tested in the engine oil described in the presence of 2% of water, a liquid, oxidised, nitrated gasoline fraction as a catalyst (concentration employed 4%) and a liquid metal naphthenate as a further catalyst [concentration employed 4%; water and the two liquid catalyst substances supplied under the Standard Reference Material No. 1817 of the National Bureau of Standards (NBS) together with a certificate of analysis]. The test is complete at a marked point of inflexion in the pressure/time diagram. The results shown in Table 4 indicate the time (in minutes) required for the point of inflexion in the pressure/time diagram.

Long times correspond to good effictiveness as a stabiliser. Stabilizer concentration:0.5%, relative to the

TABLE 4

| Stabiliser | Minutes required for marked fall in pressure |
|---|---|
| none | 76 |

TABLE 4-continued

| Stabiliser | Minutes required for marked fall in pressure |
|---|---|
| Example 3 | 106 |
| Example 4 | 115 |

Example 12

Lubricant compositions according to the invention are tested as specified in the ASTM Standard Method D 2783-81 (extreme pressure and wear Lubricant test for oil and greases, fourball machine) using the Shell fourball machine.

TABLE 5

| Base oil | Compound | Concentration in the base oil (%) | W.S.D. (mm) |
|---|---|---|---|
| Catenex P 941$^{R}$* | without additive | — | 0.9 |
| | Example 1 | 1% | 0.5 |
| | Example 3 | 1% | 0.45 |

*Base oil made by Shell

What is claimed is:

1. A mixture of substances obtainable by reacting elementary sulfur with compounds of the formula I

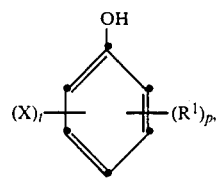 (I)

in which $R^1$ is $C_1$-$C_{12}$-alkyl, $C_5$-$C_7$-cycloalkyl, phenyl-naphthyl, 2-naphthyl, $C_7$-$C_9$-aralkyl or $C_7$-$C_9$-alkaryl, t is 1, 2 or 3, p is 0, 1 or 2 and X is one of the groups

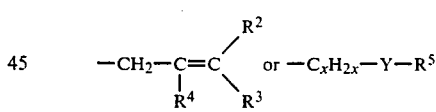

in which $R^2$, $R^3$ and $R^4$ independently of one another are hydrogen or methyl, xi O 1, 2 or 3, Y is —CO—O— or —CO—NH— and $R^5$ is a radical

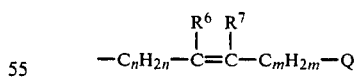

in which n and m independently of one another are integral values from O to 14, $R^6$ and $R^7$ are hydrogen or $C_1$-$C_8$-alkyl, and Q is hydrogen, methyl or a radical

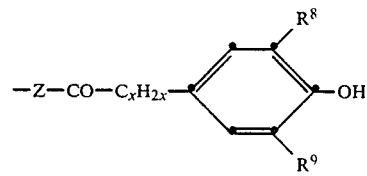

in which Z is —O— or —NH— and $R^8$ and $R^9$ independently of one another are as defined for $R^1$ or are hydrogen 2. A mixture of substances according to claim 1, in which X is a radical

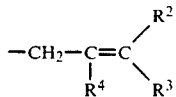

3. A mixture of substances according to claim 1, in which X is a radical $-C_xH_{2x}-Y-R^5$ 4. A mixture of substances according to claim 1, in which $R^1$ is branched $C_3-C_{12}$-alkyl, p is 1 or 2, $R^1$ being located in each case in the o-position relative to the phenolic hydroxyl group, and t is 1 and X is a radical

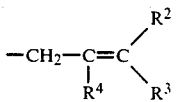

which is located in the p-position relative to the phenolic hydroxyl group.

5. A mixture of substances according to claim 1, in which $R^1$ is tert.-butyl, p is 2, t is 1 and X is $-CH_2-CH=CH_2$, both $R^1$ being located in the o-position and X in the p-position relative to the phenolic hydroxyl group.

6. A mixture of substances according to claim 1, wherein $R^1$ is branched $C_3-C_{12}$-alkyl, p is 1 or 2, $R^1$ being located in each case in the o-position relative to the phenolic hydroxyl group, and t is 1 and X is a radical $-C_xH_{2x}-Y-R^5$ which is located in the p-position relative to the phenolic hydroxyl group and in which x is 2, Y is —CO—O— and $R^5$ is a radial

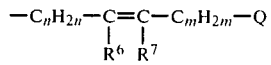

7. A mixture of substances according to to claim 1, wherein the compound of the formula I has the formula

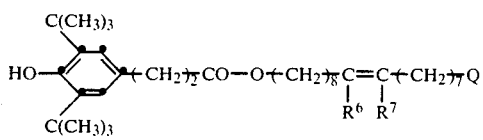

in which $R^6$, $R^7$ and Q independently of one another are hydrogen or methyl.

8. A mixture of substances according to claim 1, wherein the compound of the formula I has the formula

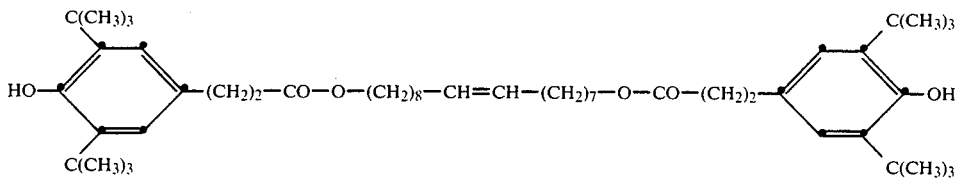

9. A mixture of substances according to claim 1, wherein the compound of the formula I has the formula

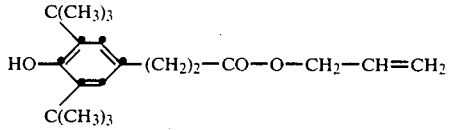

10. A process for the preparation of a mixture of substances according to claim 1, which comprises reacting 100 parts by weight of a compound of the formula I or of mixtures of these compounds with 5 to 1000 parts by weight of elementary sulfur in the presence or absence of an organic solvent and, with the reaction temperature being between 50° and 200° C.

11. A process according to claim 10 wherein the reaction is carried out in the presence of 0.1 to 20 ml % (relative to the reaction mixture) of a base.

* * * * *